Jack L. Pomeroy
W. Barton Eddison
INVENTORS

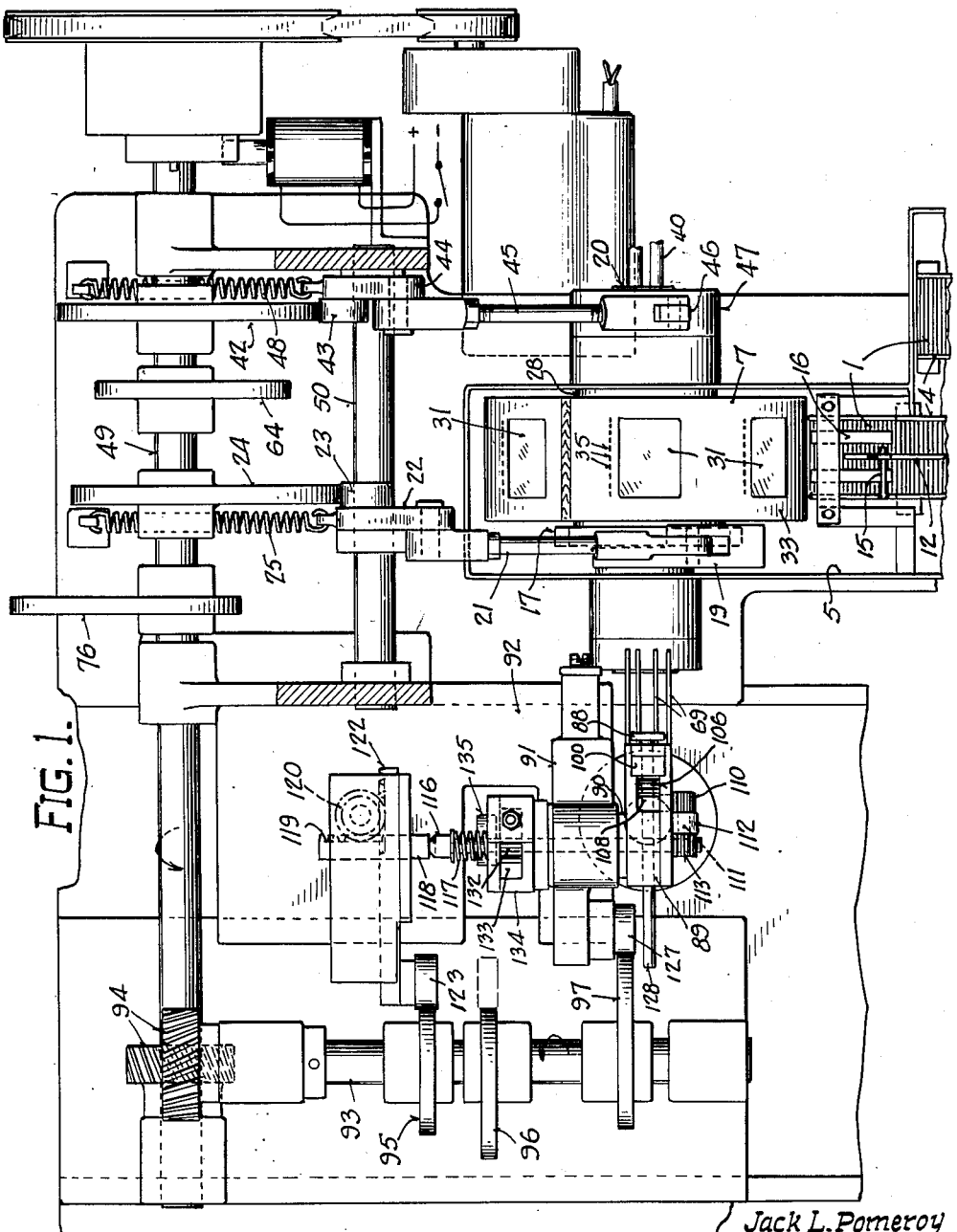

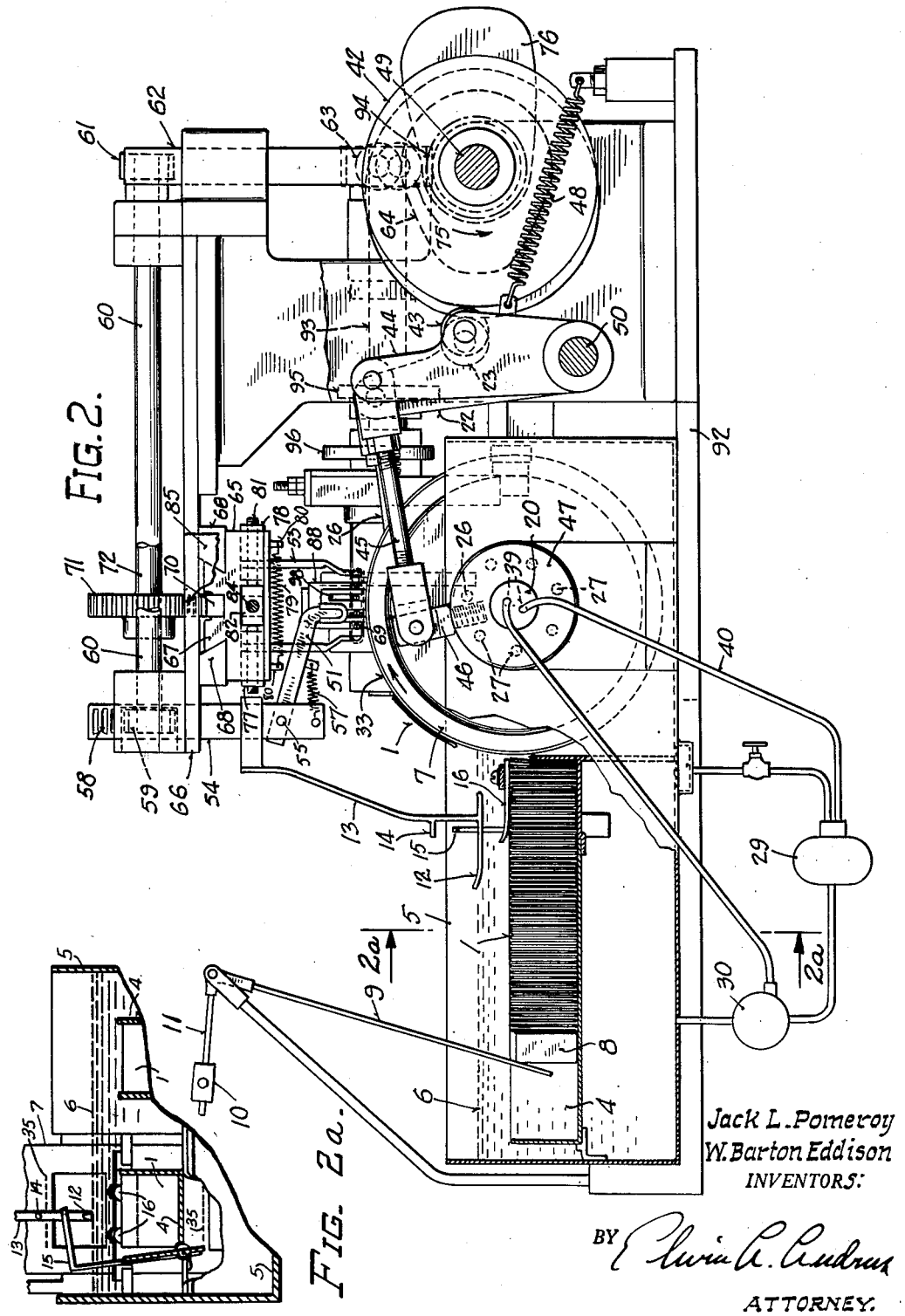

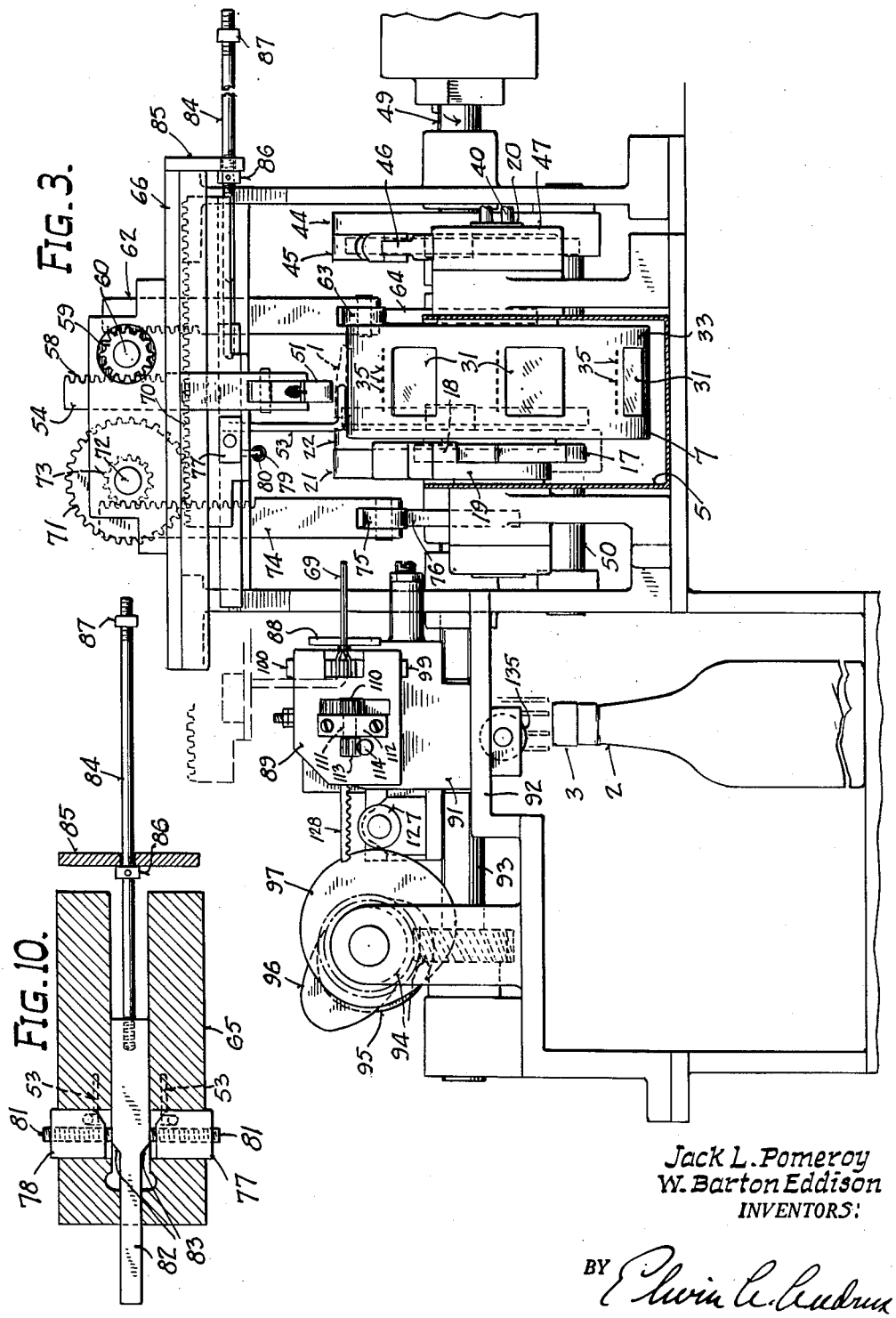

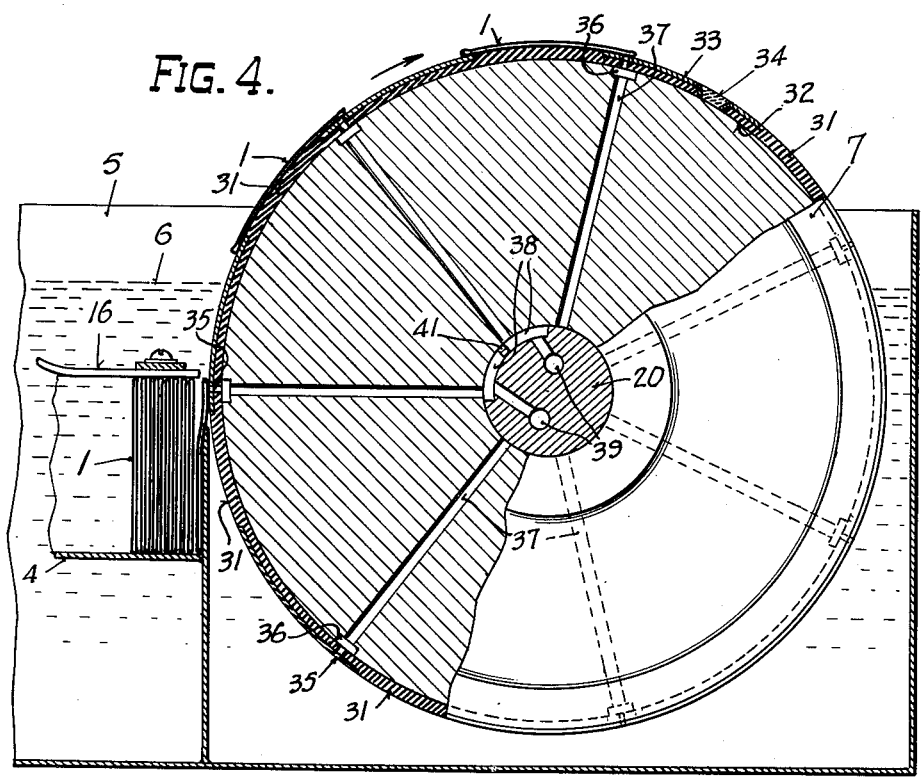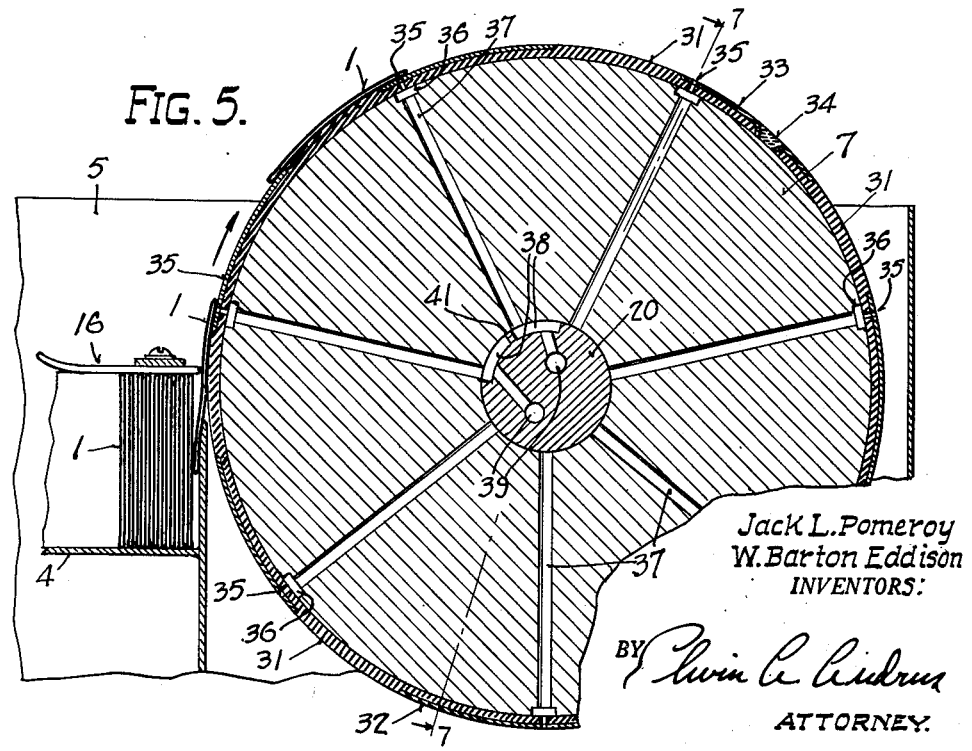

BY [signature]
ATTORNEY.

Jack L. Pomeroy
W. Barton Eddison
INVENTORS

BY

ATTORNEY.

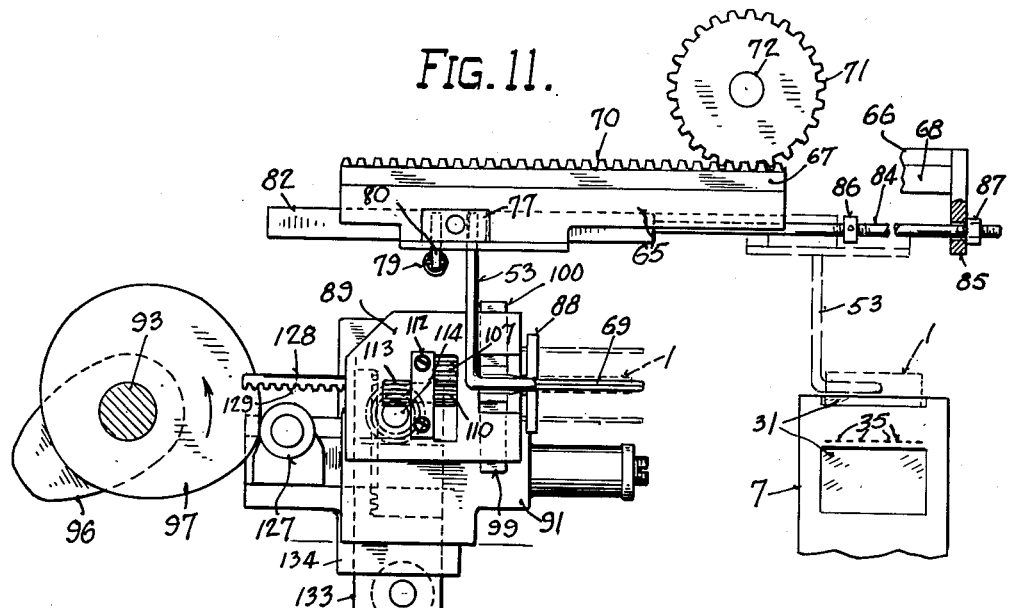
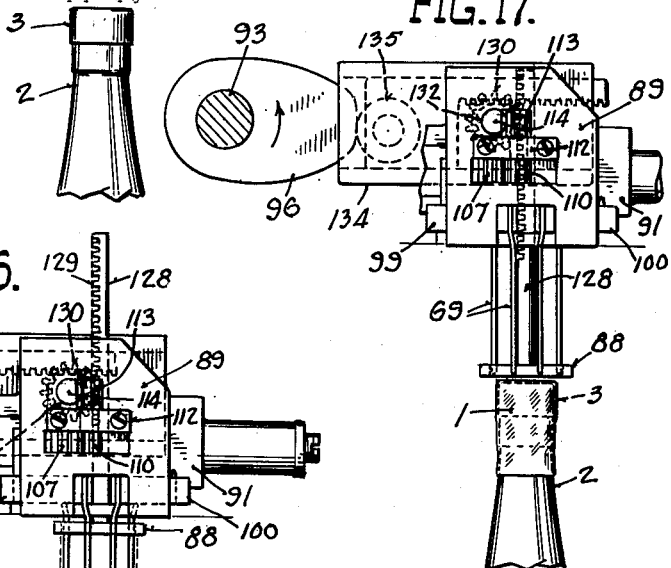
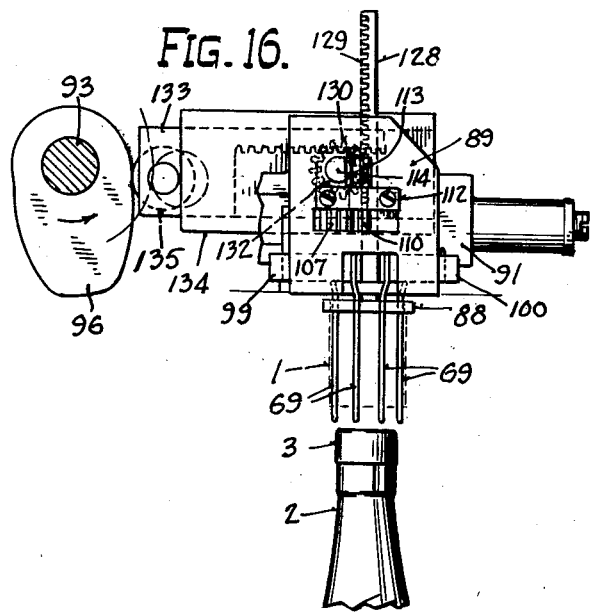
Fig. 11.
Fig. 17.
Fig. 16.
Jack L. Pomeroy
W. Barton Eddison
INVENTORS:
BY
ATTORNEY.

March 10, 1953  J. L. POMEROY ET AL  2,630,956
MACHINE FOR APPLYING SEALING BANDS TO BOTTLES
Filed April 29, 1946  10 Sheets-Sheet 8

Jack L. Pomeroy
W. Barton Eddison
INVENTORS

BY *[signature]*
ATTORNEY.

March 10, 1953  J. L. POMEROY ET AL  2,630,956
MACHINE FOR APPLYING SEALING BANDS TO BOTTLES
Filed April 29, 1946  10 Sheets-Sheet 9

Jack L. Pomeroy
W. Barton Eddison
INVENTORS.

BY
ATTORNEY.

Jack L. Pomeroy
W. Barton Eddison
INVENTORS:

BY
ATTORNEY.

Patented Mar. 10, 1953

2,630,956

UNITED STATES PATENT OFFICE 2,630,956

MACHINE FOR APPLYING SEALING BANDS TO BOTTLES

Jack Lee Pomeroy, Madison, Wis., and William Barton Eddison, Ardsley-on-Hudson, N. Y., assignors to Gisholt Machine Company, Madison, Wis., a corporation of Wisconsin Application April 29, 1946, Serial No. 665,885

35 Claims. (Cl. 226—80)

This invention relates to a machine for applying sealing bands to bottles and the like.

The machine is particularly adapted to the application of bands of wet regenerated cellulose which shrink rapidly upon drying and fit tightly upon the surface to which they are applied such as the necks and caps of bottles.

Machines for applying various types of bottle caps and covers have not been suitable for the application of regenerated cellulose bands.

The stacking of the bands in ordinary magazines with the bands exposed to the air has resulted in initial shrinking of some of the bands before they pass through the machine, depending upon the length of time the bands have been in the stack, and the machines have been incapable of handling the various sizes thereby involved, and in some instances the initial shrinking is so great as to prevent the application of the bands to the bottles. If the machine is stopped for any reason the bands in the stack become so dried and shrunk that they are no longer suitable for use.

The stripping of the bands from the stack or magazine has presented a problem due to the wide tolerances in thickness of the bands.

The suction and air pressure means employed for opening other types of seals have been entirely unsuited to the opening of wet regenerated cellulose bands. The suction and air jets dry certain parts of the bands and effect an uneven shrinkage that warps the bands out of shape and prevents proper handling of the bands in the machine.

One of the principal objects of the invention is to provide a machine which overcomes the above difficulties and which will apply sealing bands to a series of bottles passing through the machine in rapid succession and in continuous operation.

Another object of the invention is to provide a machine of this type in which the sealing bands are disposed in a magazine submerged in a liquid to preserve the bands and are removed in succession to be applied to the bottles.

Another object is to provide a machine having a simple and effective mechanical means for opening the sealing bands as they come from the magazine.

Another object is to provide a machine having a simple and effective mechanism for picking up and rapidly transferring the open sealing band to a bottle neck.

Other objects and advantages of the invention are set forth hereinafter in the description of an embodiment of the invention illustrated in the accompanying drawings.

In the drawings:

Figure 1 is a top plan view of the machine;

Fig. 2 is an end elevation of the machine with parts broken away and sectioned;

Fig. 2a is a detail transverse section taken on line 2a—2a of Fig. 2 with the operative feed trough removed;

Fig. 3 is a front elevation of the machine with the magazine tank broken away and sectioned;

Fig. 4 is an enlarged detail view sectioning the stripper and the inner end of the magazine, and showing the suction passages in the stripper;

Fig. 5 is a view similar to Fig. 4 showing the stripper in the act of lifting a band from the magazine;

Fig. 10 is a detail view partially in section showing the mechanism for expanding and contracting the pickup fingers and for operating the carriage for the fingers;

Fig. 11 is a front elevation showing the pickup fingers at the extreme of its carriage movement just after depositing a band upon the contracted loading fingers;

Fig. 16 is a front elevation of the loader showing the fingers tilted to vertical position ready to drop a band on a bottle top;

Fig. 17 is a view similar to Fig. 16 showing the band deposited upon the bottle by the stripper plate;

Figure 6:
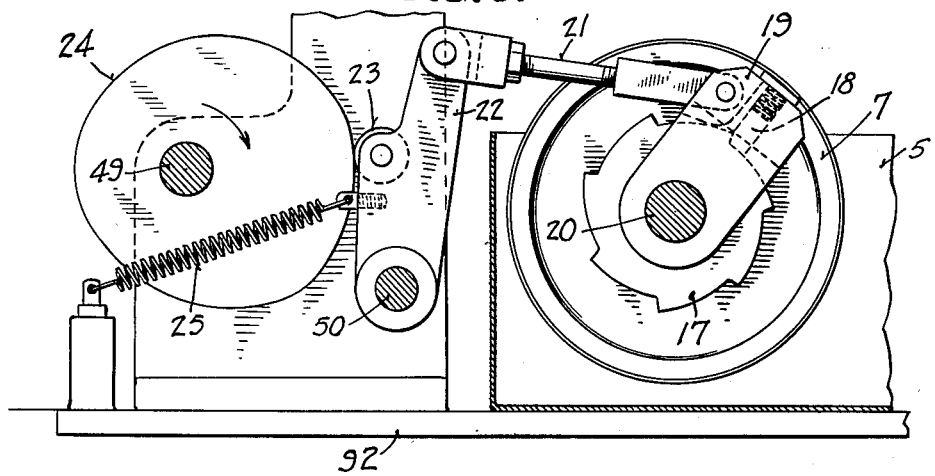
Fig. 6 is a detail view showing the drive for the stripper drum.
Figure 7:
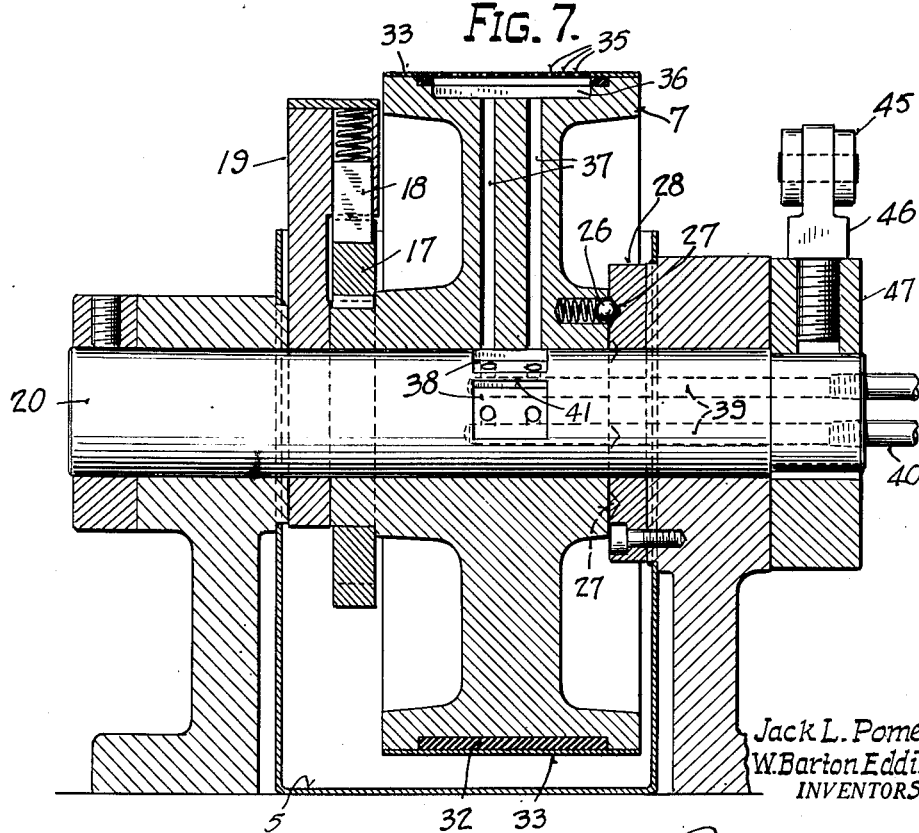
Fig. 7 is a transverse section through the stripper drum taken on line 7—7 of Fig. 5 and showing the ports therein.
Figure 8:
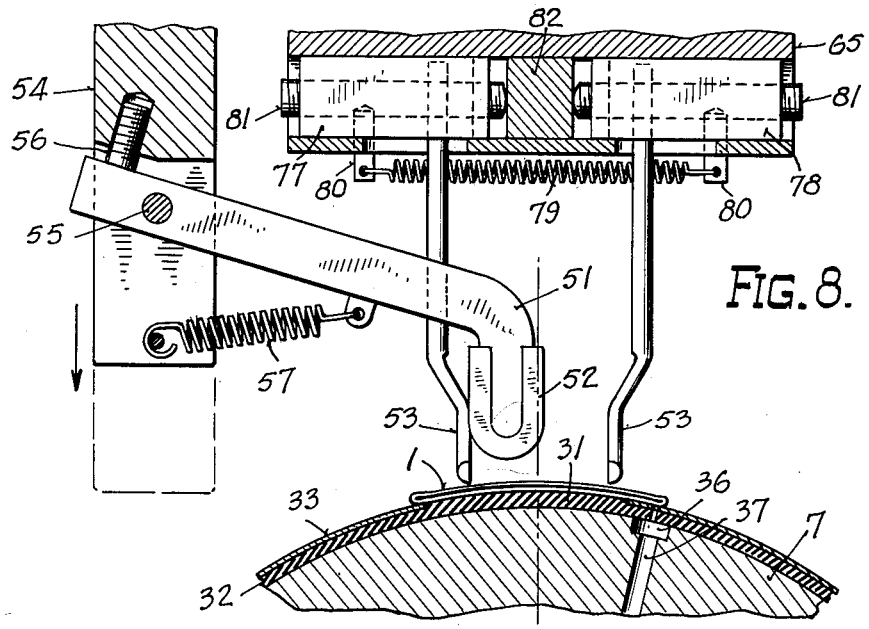
Fig. 8 is an enlarged detail section showing the opener finger disposed above a band to be opened.
Figure 9:
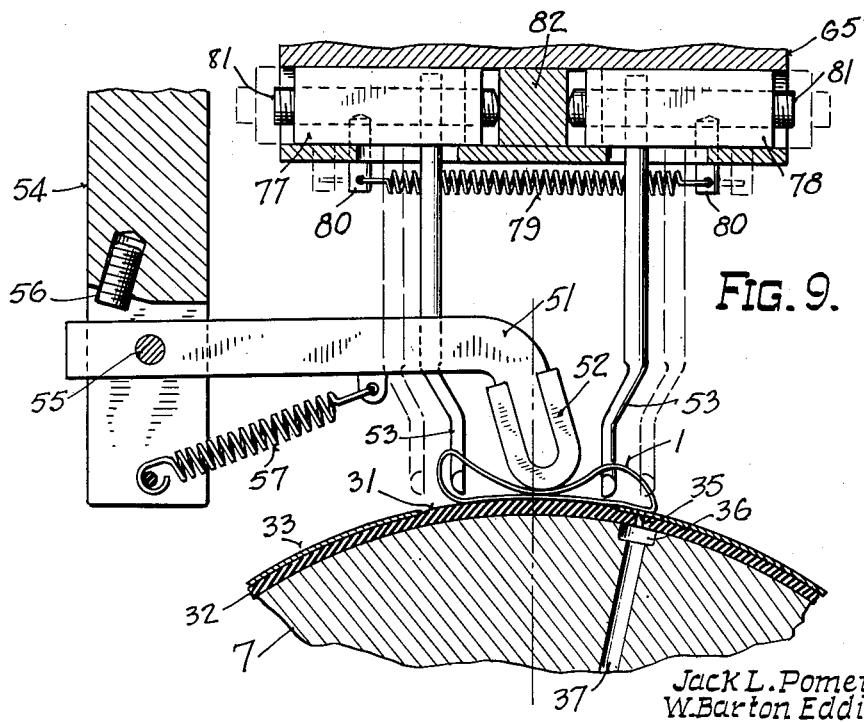
Fig. 9 is a view similar to Fig. 8 showing the finger operated to open the band.
Figure 12:
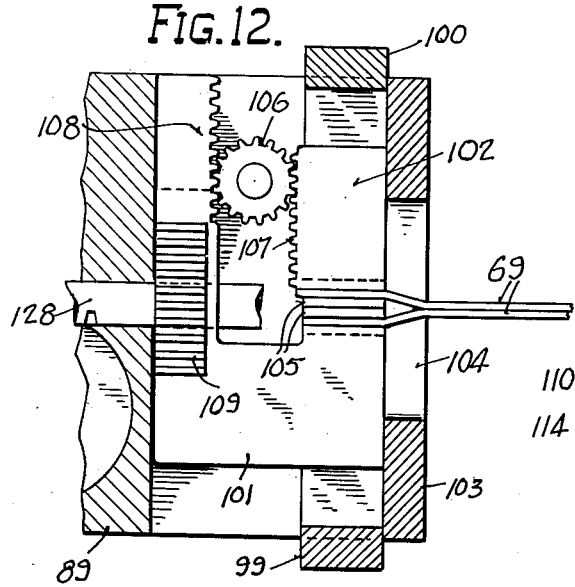
Fig. 12 is an enlarged detail section of the loading head showing the loading fingers closed together and disposed horizontally to receive a band.
Figure 13:
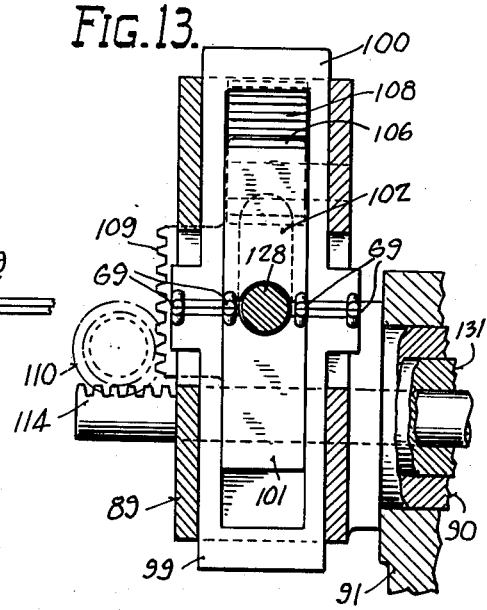
Fig. 13 is a detail section taken at right angles to Fig. 12.
Figure 14:
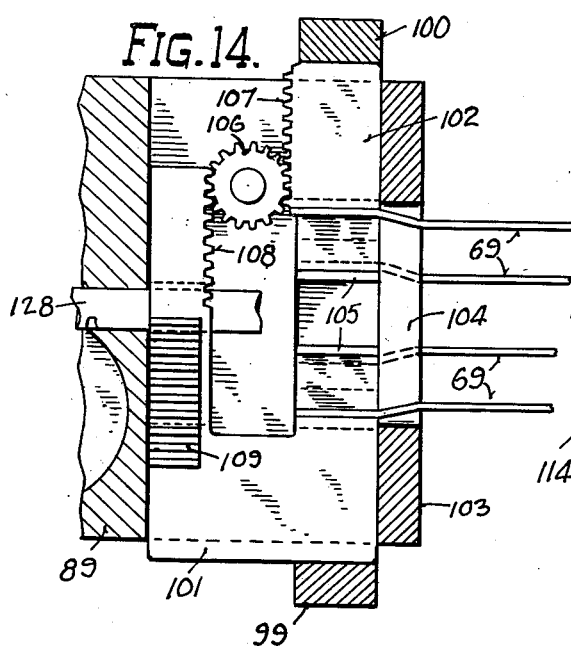
Fig. 14 is a view similar to Fig. 12 showing the loading fingers expanded to hold a band.
Figure 15:
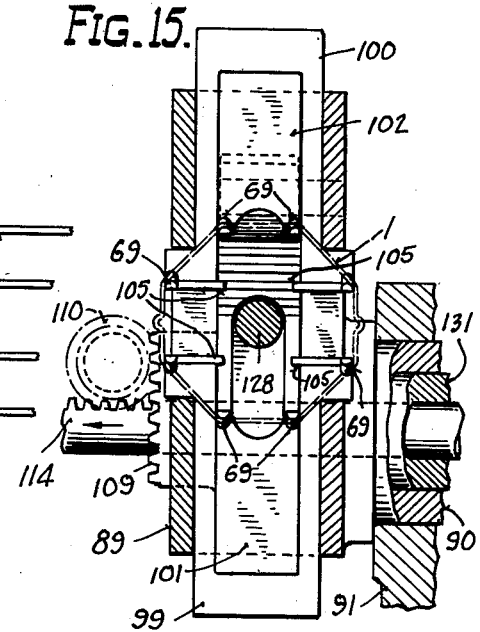
Fig. 15 is a detail section taken at right angles to Fig. 14.
Figure 18:
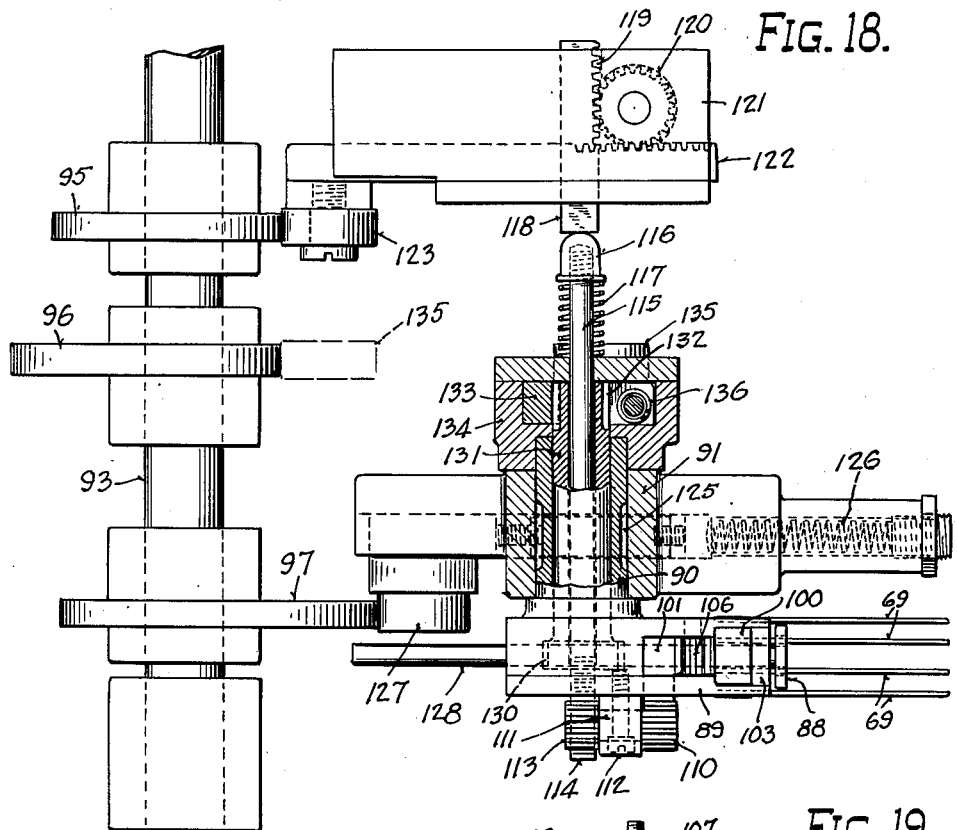
Fig. 18 is a detail plan view partially in section showing the mechanism for operating the loading fingers and for tilting the same.
Figure 19:
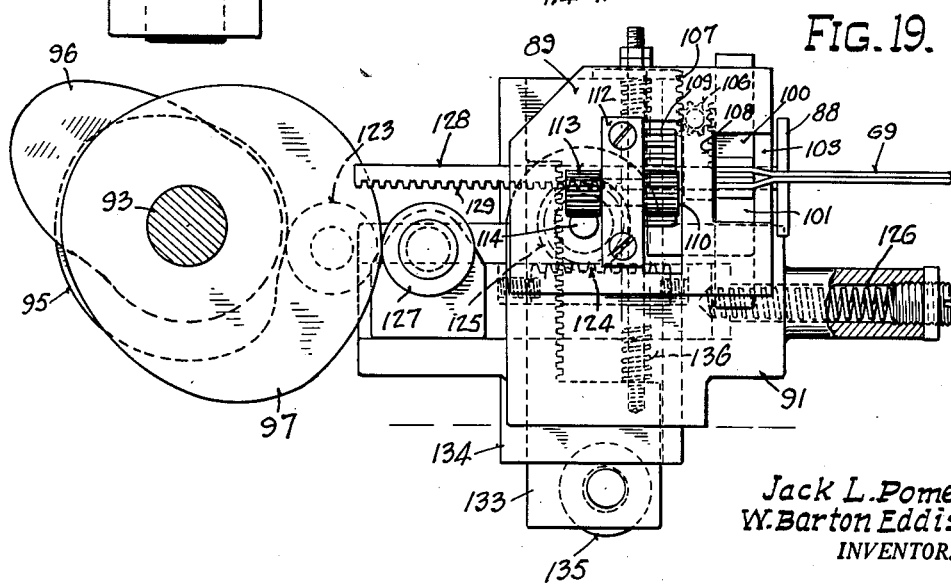
Fig. 19 is an end elevation of Fig. 18.
Figure 20:
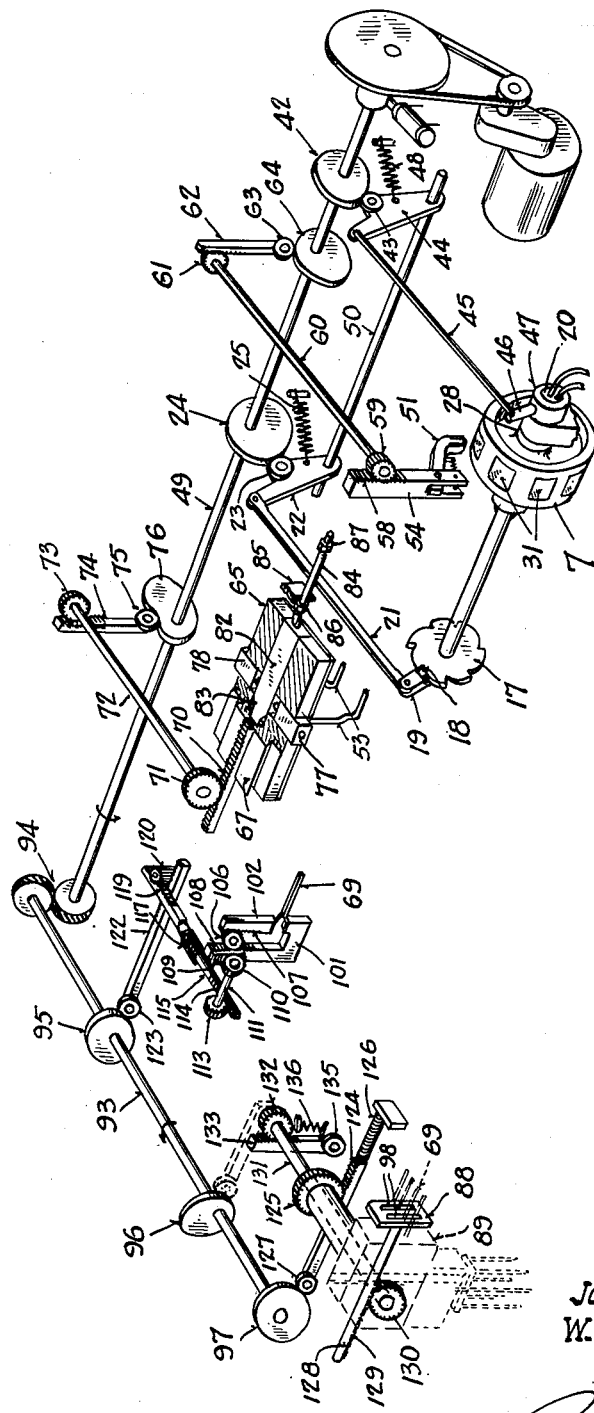
Fig. 20 is a schematic showing of the various operative parts with the cams for driving the same.

The machine is made up of a plurality of parts operated in synchronism to strip successive bands from a magazine, open the same, pick them up individually and transfer them to loading fingers, expand the loading fingers to shape the respective bands, translate the bands from a horizontal transporting position to a vertical position over a bottle top, and drop the bands onto the bottles, one by one. The parts are all operated from a single source of power in rapid time cycle whereby each separate movement constitutes only a small part of the total time of applying a single band, and while one band is being dropped on a bottle another is being opened and picked up, and while one is being transferred to the loading fingers another is being stripped from the magazine.

The seal bands 1 of regenerated cellulose are tubular and are folded flat and packed in cans of glycerin solution or other suitable preservative liquid. When removed from the liquid they quickly dry and shrink. When applied to bottle tops 2, as shown, the bands shrink to the shape of the corresponding tops and seal the caps 3 in place so that the latter cannot be removed without first breaking the dry seal bands.

The bands 1 are stacked and placed on edge, side by side, in a magazine trough 4 in a tank 5 filled with preservative liquid 6 to a level above the bands. The tank preferably has two troughs 4 removably supported therein side by side and which are readily interchangeable so that an operator may fill one while the other is emptying.

The operative trough 4 is disposed horizontally and substantially radially of a large rotary stripper cylinder 7 which has its upwardly moving side disposed on a level with the bands 1 and extending transversely across the inner end of the stack so that the end band lies up against the cylinder ready to follow the cylinder in its upward movement.

The outer end of the stack of bands 1 is pressed forwardly toward the cylinder 7 by means of a pusher plate 8 pressed thereagainst by a pivotal lever arm 9 biased in the direction referred to by a weight 10 on the outer end of a corresponding arm 11 thereof.

The movement of the stack or magazine of bands 1 forwardly by pusher plate 8 is facilitated by a vertical and lateral periodic tamping of the bands by means of a vertically reciprocating shoe 12 engaging the top of the bands and the hinging and tilting of one of the side walls of the trough 4 toward the bands. The shoe 12 is secured to the lower end of a vertical arm 13 which in turn is driven by mechanism to be described later herein. The arm 13 has a projection 14 adapted to engage a lateral arm 15 on the hinged side of trough 4 to effect tilting of the side wall toward the bands. This periodic tamping of the bands straightens the stack and brings the bands into true position for stripping by drum 7.

A stationary shoe 16 rests on top of the magazine adjacent the stripper drum 7 and has its forward edge curved upwardly to facilitate entrance of the bands 1 beneath the same. The shoe 16 has its inner edge spaced from drum 7 at a distance at least as great as the maximum thickness for the bands 1.

The stripper drum 7 is adapted to pick up successive bands 1 from the magazine as the drum rotates on a horizontal axis. The drum illustrated rotates intermittently and is operated by any suitable intermittent clutch such as the ratchet 17 (Fig. 6) secured to the side of the drum and the pawl 18 spring pressed to engage the ratchet and mounted on an arm 19 pivotally mounted on the shaft 20 of the drum. The arm 19 is reciprocated through a limited cycle of rotation by a link 21 joining the same to a pivoted operating arm 22 having a cam follower 23 adapted to engage and follow a rotary drive cam 24 for the drum. The arm 22 is biased toward the cam 24 by a tension spring 25 at all times, and which holds follower 23 in constant contact with cam 24.

The drum 7 has a plurality of stripping stations, preferably about seven stations, spaced about its circumference. Likewise, ratchet 17 has the same number of teeth so that for each completed movement of the ratchet the drum 7 presents a new stripper station adjacent the end band 1 in the magazine.

The rotation of the drum is obtained by means of spring 25 biasing arm 22 inwardly following cam 24, and the drum is indexed and held stationary during the time when the cam 24 forces arm 22 outwardly against spring 25 to set the pawl 18 in the next notch of ratchet 17.

Each rotation of cam 24 represents one cycle of operation for the machine and is timed to coincide with the time between each placement of a band 1 on a bottle. There are seven such cycles of the machine for each complete revolution of the drum 7.

The indexing and holding of drum 7 against rotation is accomplished by the spring-pressed detent 26 in the hub of the drum engaging in a recess 27 in the hardened end plate 28, there being a recess 27 for each index position of the drum.

The intermittent rotation of drum 7 and the movement of shoe 12 serves to keep liquid 6 somewhat agitated. In addition to this, the liquid is preferably recirculated through tank 5 by means of a gear pump 29 and also of a jet pump 30.

Each stripper station on drum 7 has a rubber or neoprene face 31 to which a band 1 may cling. For this purpose the drum 7 may have a circumferential strip of neoprene 32 encircling the same and compressed thereon by a thin stainless steel strip 33 having its ends welded together at 34. The strip 33 has a rectangular opening at each stripper station of a size a little less than a band 1 and through which the neoprene is exposed to receive a band.

To effect stripping of a band 1 from the magazine, each stripper station on drum 7 has a series of vacuum holes 35 extending in a row across the drum immediately above the face 31 so that the top edge of the corresponding band 1 is sucked against the drum to lift the band as the drum rotates to present the next station.

The vacuum is applied to holes 35 for each station by means of a groove 36 in strip 32 and drum 7 constituting a header for the holes and which is connected through radial passages 37 in drum 7 to one of two recesses 38 in shaft 20 and through a passage 39 for the corresponding recess 38 extending longitudinally of shaft 20 to a conduit 40 leading to gear pump 29.

The recesses 38 are separated by a narrow rib 41 and each extends circumferentially of shaft 20 a distance sufficient to connect with a single set of radial passages 37 in drum 7 and nearly to an adjacent set. The recesses 38 connect with adjacent sets of passages 37.

When the drum is indexed and a band 1 is about to be stripped from the magazine the lower recess 38 applies suction to the stripper station next to the foot of the magazine and the upper recess applies suction to the corresponding station next above the magazine. When drum 7 is rotated to its next succeeding indexed position, shaft 20 is likewise rotated to maintain the vacuum on the bands at the two stations during the rotational movement of the drum. As soon as the drum is indexed, the shaft 20 is rotated in a reverse direction an amount equal to the previous rotational movement, and during which reverse movement it continues to apply a vacuum to the band 1 on the station above the magazine. When the shaft 20 reaches the end of its reverse stroke it connects the lower recess 38 with the passages 37 for the next succeeding stripper station at the foot of the magazine and secures a band 1 to the drum for stripping the band from the magazine upon the next rotational movement of the drum, and the upper recess 38 is then connected with passages 37 for the angularly disposed stripper station next above the magazine.

The shaft 20 constitutes a valve member for applying vacuum to the several stripper stations in succession as the latter are presented to the magazine and rise above the same in the stripping operation. The vacuum is applied to each band 1 along a closed edge thereof where there is little danger of warping the band, and the opening and transferring of the band to a bottle top is so rapid thereafter that there is no time for any initial shrinking of the band to make its handling difficult.

The valve shaft 20 is operated by means of a cam 42, a follower 43 on pivotal arm 44 and a link 45 joining arm 44 to a pin 46 set in a flange 47 on the shaft 20. A spring 48 biases the arm 44 toward cam 42 to maintain the follower 43 in contact with the cam.

The cams 24 and 42 are mounted on a common drive shaft 49 disposed parallel to shaft 20. Likewise, the cam follower arms 22 and 44 may be pivotally mounted on a common pin 50 disposed parallel to shafts 20 and 49.

The two cam movements for stripping a band 1 from the magazine involve the intermittent rotation of drum 7 by cam 24, and the operation of valve member 20 by cam 42.

When a stripper station with its band 1 reaches the second stop or upper position on drum 7 the band lies nearly horizontal on the face 31. At this time an opener finger 51 having a rubber or neoprene tip covering 52 is lowered into engagement with the top surface of the band near its center. The finger 51 is then moved a short distance in the direction of rotation of drum 7 while the latter is held stationary by the detent 26. This movement of finger 51 distorts the band 1 to produce a separation of the walls thereof in front of and behind the finger so that the band is opened near its two side edges to receive a pair of pickup and transfer fingers 53.

During the time the band 1 is being opened by finger 51 the valve shaft 20 is being returned to apply suction to the new stripper station. The return of the valve cuts off the vacuum connection from the band 1 that is being opened.

The finger 51 is raised from the band 1 as soon as fingers 53 enter the band to lift the same from the drum.

The operation of finger 51 is effected by mounting the same on a vertically movable post 54. The finger 51 is pivoted at a point 55 on post 54 substantially above the level of the tip 52 of the finger and the finger 51 extends laterally downward from the pivot to its tip so that downward movement of the post 54 is translated into a lateral movement of the tip 52 as the finger pivots on its support.

For the purpose of lifting the finger 51 from band 1 a stop 56 is provided on post 54 and against which the finger engages as the post moves upwardly, thereby stopping further pivotal movement of the finger and raising the same with the post. When post 54 lowers, the finger 51 moves downwardly therewith until the tip 52 engages band 1 at which time further lowering of the post effects a pivotal movement of finger 51 away from stop 56 and causes the tip 52 to move sidewise upon band 1 and open the same as described. The fingers 53 then enter the band and are expanded by separation to secure the band thereon while finger 51 is being raised from the band.

A tension spring 57 is preferably employed between the finger 51 and the lower end of post 54 to bias the finger downwardly upon band 1 with a predetermined pressure and in a direction effecting engagement between the finger and stop 56. The spring prevents displacement of the finger during rapid operation of the machine from the inertia of the weights involved.

The post 54 is operated by a vertical rack 58 on its upper end meshing with a gear 59 on a horizontal rock shaft 60 that extends transversely of shaft 49 and is in turn rotated by a gear 61 on the rear end of shaft 60 meshing with a vertical rack 62 having a cam follower 63 on its lower end riding on a cam 64 on shaft 49.

The pickup fingers 53 are L-shaped and depend from a transfer carriage 65 supported for horizontal movement by an upper frame work 66 which also carries the shaft 60 and its appurtenances. The carriage 65 has an upper dovetail tenon 67 fitting between beveled guideways 68 secured to the underside of frame 66, and the carriage 65 is adapted to move longitudinally of the guideways in a direction parallel to the axis of drum 7 and to cam shaft 49.

The movement of carriage 65 effects the transfer of band 1 by fingers 53 from the drum 7 to the loading fingers 69. For this purpose, the top surface of tenon 67 has a rack 70 which meshes with a gear 71 on a horizontal rack shaft 72 carried by frame 66 and which in turn is driven by a gear 73 on its rear end meshing with a vertical rack 74 having a cam follower 75 on its lower end riding on a cam 76 on shaft 49.

The fingers 53 are carried by individual transverse slides 77 and 78 which are biased inwardly toward each other by a tension spring 79 extending between pins 80 depending from the slides. Each of the slides 77 and 78 has an adjustable pin 81 threaded therethrough and having a rounded inner end to engage an operating cam 82 adapted to spread the slides apart at a predetermined point in the cycle of the machine and to allow spring 79 to move the slides together at another point in the cycle.

Cam 82 comprises a longitudinal slide mounted in carriage 65 between slides 77 and 78, and which has a relatively thin section with parallel sides at one end, a relatively thick section with parallel sides at the other end, and a beveled cam section 83 therebetween. Movement of cam slide 82 longitudinally of carriage 65 determines which end section of the slide is disposed between the slides 77 and 78 thereby determining the separation of the latter slides and of the corresponding fingers 53.

The cam slide 82 is operated automatically by the reciprocation of carriage 65, the operation being effected by a rod 84 secured axially to slide 82 and extending parallel to the movement of the carriage. Rod 84 passes loosely through a plate 85 fixed to frame 66, and the rod carries a pair of stop nuts 86 and 87 adjustably threaded thereon on opposite sides of plate 85.

When carriage 65 moves toward drum 7 to enter fingers 53 into a band 1 to be picked up, and just before the carriage reaches the extreme of its movement, after initial entry of fingers 53 in the band, stop nut 86 engages plate 85 and stops further movement of cam slide 82 with the carriage. As carriage 65 continues to the end of its stroke, cam section 83 on slide 82 rides between the inner ends of pins 81 and forces slides 77 and 78 apart, thereby separating fingers 53 and causing them to pick up the band 1 which is then tightly stretched across the fingers.

The carriage 65 is then reversed in direction carrying cam slide 82 with it until the band 1 is slipped over the ends of the loader fingers 69. As the carriage 65 approaches the end of this transfer stroke and the band 1 engages the stripper plate 88 which stops further travel of the band, the outer stop nut 87 on rod 84 engages plate 85 and stops further travel of cam slide 82. As carriage 65 continues to the end of its stroke to release band 1 from fingers 53, cam section 83 on slide 82 is withdrawn from between the inner ends of pins 81 and the slides 77 and 78 are moved inwardly by spring 79 thereby moving the fingers 53 toward each other to release the band as the fingers move rearwardly clear of the band.

Before the carriage 65 is moved forwardly to pick up another band 1 the loader fingers 69 are expanded by separation to provide a substantially circular shape for the band thereon and the fingers 69 are tilted downwardly to position the band vertically over a bottle top 2 and out of the way of the returning fingers 53. When the fingers 69 have deposited the band 1 upon a bottle top 2 the fingers 69 are returned to horizontal contracted position in line to receive the next succeeding band from fingers 53.

The transfer of band 1 from drum 7 to loader fingers 69 involves the opening of the band by finger 51 driven by cam 64 which raises and lowers the finger; the entrance of fingers 53 into the open band by movement of carriage 65 driven by cam 76; the separation of fingers 53 to pick up the band; the carrying of band 1 to fingers 69 by carriage 65; the contracting of fingers 53 and withdrawal of the same from the band; and the return of the contracted fingers 53 by carriage 65 to position for picking up the next band.

There are three basic movements involved in loading: (1) the expansion and contraction of fingers 69 so that the fingers are arranged in a common plane when receiving a band 1 from fingers 53 and are expanded to give the band a substantially circular open shape when applying the same to a bottle top 2; (2) the tilting of the fingers from horizontal to vertical and back again; and (3) the reciprocation of stripper plate 88 which pushes the band 1 downwardly from fingers 69 onto the top of bottle top 2.

For this purpose the fingers 69 and stripper plate 88 are carried by a loader block 89 which is secured on one end of a sleeve 90 journaled in and extending through a pedestal 91 fixed on the base 92 of the machine. The axis of sleeve 90 is at right angles to the axis of drum 7 and drive shaft 49. The block 89 is disposed at a height in which fingers 69 will register in the same horizontal plane with fingers 53 to receive a band 1, and in which the fingers 69 will register with the bottle tops 2 and be disposed just above the same to deposit the bands thereon as each bottle is moved successively thereunder to receive the band.

A secondary drive shaft 93 is provided parallel to the axis of sleeve 90 and to one side of the pedestal 91 and is driven from shaft 49 by suitable gearing 94. Three cams are mounted on shaft 93, cam 95 serving to operate fingers 69, cam 96 serving to reciprocate the stripper plate 88 and cam 97 serving to oscillate the loader block 89.

There are preferably eight fingers 69 in the form of parallel wires and arranged in pairs. When the block 89 is disposed with the fingers horizontal and ready to receive a band 1 from fingers 53, each pair of fingers has one finger lying above the other. The pairs of fingers 69 are about equally spaced apart laterally so that the outermost pairs are disposed on opposite sides of the stripper plate 88 and the innermost pairs extend through vertical slots 98 in the stripper plate.

The lower fingers 69 of each outer pair are secured to the top of a lower U-shaped vertical slide 99 and the upper fingers 69 of each outer pair are secured to the bottom of an inverted upper U-shaped vertical slide 100. Said slides 99 and 100 are disposed for corresponding vertical movement in opposite directions so that when the slides are closed together the fingers 69 carried thereby are closed for passage of band 1 thereover, and when the slides are separated vertically the corresponding fingers 69 are likewise separated vertically to expand the band.

The lower fingers 69 of each inner pair are secured to the top of a lower inner slide 101 adapted to slide vertically in the U of the slide 99, and the upper fingers 69 of each inner pair are secured to the bottom of an upper inner slide 102 adapted to slide vertically in the U of the slide 100. A front plate 103 on block 89 covers the slides 99 to 102 to hold them in place, and has vertical channels 104 therethrough for receiving the corresponding fingers 69 and guiding their movement.

Slides 99 and 100 have flanges 105 extending inwardly from each side and disposed between slides 101 and 102 so that when the latter are closed together they effect closing of slides 99 and 100 upon each other to bring the outer fingers 69 together.

Slides 101 and 102 are synchronized in movement by means of a transverse pinion 106 mounted in end bearings in the side walls of block 89 and meshing with a vertical rack 107 on the back of upper slide 102 and with a corresponding vertical rack 108 on the front of an upstanding body projection at the rear of slide 101. Movement of slide 101 either up or down effects a corresponding movement of slide 102 in the opposite direction.

Slide 101 is driven by a vertical rack 109 on its side which meshes with drive gear 110 whose shaft 111 is centrally journaled in a bearing member 112 on block 89. The end of shaft 111 opposite gear 110 has a gear 113 driven by a rack 114 disposed on a central push rod 115 which is in turn disposed axially through sleeve 90. The opposite end of push rod 115 has a flanged head 116 for confining a coil spring 117 on rod 115 biasing the same in a direction effecting closing of the fingers 69 together.

The push rod 115 is moved in opposition to spring 117 to separate fingers 69, by means of a second push rod 118 abutting the end of rod 115 and having a rack 119 thereon meshing with gear 120 in the fixed housing 121. The gear 120 is in turn driven by rack 122 having a cam follower 123 on its end engaging cam 95 on shaft 93.

The cam 95 is constructed to effect separation of the fingers 69 as soon as fingers 53 leave the band 1 and before tilting of the fingers from horizontal position so that the band is tightly stretched on the fingers when the latter tilt to vertical position. In separating, the fingers 69 of the inner pairs move substantially farther than those of the outer two pairs in order to provide a nearly circular shape for band 1.

The cam 95 is constructed to effect closing of the fingers 69 together upon the return tilting movement of the fingers so that they are closed when they reach horizontal position for receiving the next band 1.

The loader head 89 is oscillated through a quarter of a revolution and back on the axis of sleeve 90 in tilting the fingers 69 from horizontal to vertical and back again. This movement of head 89 is effected by rack 124 extending horizontally through pedestal 91 and meshing with gear teeth 125 on the outside of sleeve 90.

The rack 124 is biased outwardly by a spring 126 at its rear end in pedestal 91, in a direction to maintain head 89 with fingers 69 normally horizontal.

The rack 124 is moved inwardly against spring 126 by means of a cam follower 127 on the outer end of the rack and engaging cam 97 on shaft 93.

The stripper plate 88 is mounted on the end of a push rod 128 extending through block 89 and having a rack 129 on its outer end meshing with a gear 130 on the end of a tubular shaft 131 journaled in sleeve 90 and containing axial push rod 115. The shaft 131 has a gear 132 at the end opposite gear 130, and which is driven by a rack 133 meshing with gear 132 and disposed in a slideway in a housing 134 fixed to the end of sleeve 90.

When sleeve 90 rotates head 89 to present fingers 69 vertically over a bottle top 2, it likewise rotates housing 134 to present a cam follower 135 on the outer end of rack 133 to the operating cam 96 on shaft 93. Cam 96 effects inward movement of rack 133 and thereby a downward movement of stripper plate 88 to push the band 1 downwardly from fingers 69 and onto the bottle top 2. Rack 133 is biased outwardly to normal position by means of a spring 136 disposed in housing 134.

The cam 96 effects a rapid downward movement of stripper plate 88 after fingers 69 locate the band 1 vertically above a bottle top 2. The cam 96 cooperates with the return rotary movement of head 89 to release cam follower 135 and let spring 136 return the stripper plate 88 to retracted position during the upward tilting of fingers 69 to horizontal position.

The machine has been constructed to have a time cycle less than one one-hundredth of a minute and will therefore place more than one hundred seals a minute. The several movements involved are either overlapping or successive in their individual cycles and in general there will be only two bands on their way from the magazine as one band is being deposited on a bottle top by fingers 69. Three bands are in the process of handling by the machine at all times. Consequently the time of handling of each band from the time it leaves the preservative solution 6 to the time it is deposited on bottle top 2 is only about two seconds.

The bottles, as they are conveyed successively to the machine, should be stopped at the sealing station beneath fingers 69 to receive the bands 1. The conveyor mechanism for the bottles is not shown as it constitutes no part of the present invention.

The machine may have various automatic controls and safety devices, if desired.

Various embodiments of the invention may be employed within the scope of the accompanying claims.

We claim:

1. In a machine for applying seals of the tubular shrink fit regenerated cellulose type to bottle tops and the like, a tank for containing preservative liquid for the seals, means in said tank for receiving a horizontal magazine of flat seals placed on edge in said magazine, a rotary stripper drum disposed to be partially submerged in the liquid in said tank and presenting an upwardly movable cylindrical surface adjacent a part of the flat surface of the seal at one end of the magazine, means for moving the end seal and of corresponding seals successively by the and means for effecting the lifting of said end seal and corresponding seals successively by the upwardly moving cylindrical surface of said drum as the latter rotates.

2. In a machine for applying seals of the tubular shrink fit regenerated cellulose type to bottle tops and the like, a tank for containing preservative liquid for the seals, means in said tank for receiving a horizontal magazine of flat seals placed on edge in said magazine, a rotary stripper drum disposed to be partially submerged in the liquid in said tank and presenting an upwardly movable cylindrical surface spaced a predetermined distance from the flat surface of the seal at one end of the magazine, means for moving said seals toward said stripper drum, a shoe disposed above the magazine and spaced from said upwardly moving drum surface the thickness of a single seal, means for moving the upper edges of the successive end seals against said drum and out from beneath said shoe, and means for effecting the lifting of the seals successively by the upwardly moving cylindrical surface of said drum as the latter rotates.

3. In a machine for applying seals of the tubular shrink fit regenerated cellulose type to bottle tops and the like, a horizontal magazine adapted to contain a plurality of flat seals placed on edge, a rotary stripper drum disposed to present an upwardly movable cylindrical surface spaced a predetermined distance from the flat surface of the seal at one end of the magazine, means for moving said seals toward said stripper drum, means for moving the upper portion of the end seal against said drum, means for effecting the lifting of the end seal and corresponding seals successively by said drum as the latter rotates, and means to remove said seals successively from said drum and tranfer the same to corresponding bottle tops.

4. In a machine for applying seals of the tubular shrink fit regenerated cellulose type to bottle tops and the like, a horizontal magazine adapted to contain a plurality of flat seals placed on edge, a rotary stripper drum disposed to present an upwardly movable cylindrical surface adjacent the flat surface of the seal at one end of the magazine, means for moving said seals toward said stripper drum, a nonslip outer surface for said drum adapted to aid in lifting said seals successively from said magazine one by one as the drum rotates, means to hold said seals in engagement with said drum surface to effect lifting of successive seals thereby, and means cooperating with said non-slip surface to open each said seal while the same is on said drum.

5. In a machine for applying seals of the tubular shrink fit regenerated cellulose type to bottle tops and the like, a horizontal magazine adapted to contain a plurality of flat seals placed on edge, a rotary stripper drum disposed to present an upwardly movable cylindrical surface adjacent the flat surface of the seal at one end of the magazine, means for moving said seals toward said stripper drum, a nonslip outer surface for said drum adapted to aid in lifting said seals successively from said magazine one by one as the drum rotates, means to hold said seals in engagement with said drum surface to effect lifting of successive seals thereby, and means adapted to press upon the outer surface of each successive seal on said drum with a nonslip surface of small area after the seal has been stripped from said magazine and to move laterally thereto a short distance in a direction toward a closed edge of the seal to effect opening of the seal near its two closed edges.

6. In a machine for applying seals of the tubular shrink fit regenerated cellulose type to bottle tops and the like, a horizontal magazine adapted to contain a plurality of flat seals placed on edge, a rotary stripper drum disposed to present an upwardly moving cylindrical surface adjacent the flat surface of the seal at one end of the magazine, means for moving said seals toward said stripper drum, a plurality of circumferentially spaced non-slip faces on said drum constituting stripper stations adapted to engage corresponding seals and aid in lifting the same one by one from said magazine, means to lift said seals in engagement with said drum faces, and means adapted to press upon the outer surface of each successive seal on said drum with a non-slip surface of small area after the seal has been stripped from said magazine and to move laterally thereto a short distance in a direction toward a closed edge of the seal to effect opening of the ends of the seal near its two closed edges.

7. In a machine for applying seals of the tubular shrink fit regenerated cellulose type to bottle tops and the like, a horizontal magazine adapted to contain a plurality of flat seals placed on edge, a rotary stripper drum disposed to present an upwardly moving cylindrical surface adjacent the flat surface of the seal at one end of the magazine, means for moving said seals toward said stripper drum, a non-slip outer surface for said drum adapted to aid in lifting said seals successively from said magazine one by one as the drum rotates, means to lift said seals in engagement with said drum, means cooperating with said non-slip surface to open each said seal while the same is on said drum, and means entering said open seal to pick up the same from said drum and effect transfer of the seal to a bottle top.

8. In a machine for applying seals of the tubular shrink fit regenerated cellulose type to bottle tops and the like, a horizontal magazine adapted to contain a plurality of flat seals placed on edge, a rotary stripper drum disposed to present an upwardly moving cylindrical surface adjacent the flat surface of the seal at one end of the magazine, means for moving said seals toward said stripper drum, a plurality of circumferentially spaced non-slip faces on said drum constituting stripper stations adapted to engage corresponding seals and aid in lifting the same one by one from said magazine, means to lift said seals in engagement with said drum faces, means adapted to press upon the outer surface of each successive seal on said drum with a non-slip surface of small area after the seal has been stripped from said magazine and to move laterally thereto a short distance in a direction toward a closed edge of the seal to effect opening of the ends of the seal near its two closed edges, and means entering said open seal to pick up the same from said drum and effect transfer of the seal to a bottle top.

9. In a machine for applying seals of the tubular shrink fit regenerated cellulose type to bottle tops and the like, a magazine adapted to contain a plurality of flat seals, a rotary stripper drum disposed at the discharge end of said magazine, means to rotate said drum in a direction to present a movable cylindrical surface adjacent the flat surface of the seal at said discharge end of the magazine, said drum having non-slip stripper stations on its outer surface, means to periodically interrupt the rotation of said drum to index said stripper stations successively with respect to the end seal of said magazine, suction means effecting gripping of successive seals by corresponding stripper stations of the drum during corresponding periods of dwell between successive intermittent rotary movements of the drum and to strip the seals from the magazine upon rotation of the drum, and means to remove successive seals from the stripper stations of the drum as the latter is indexed by a dwell in rotation with said removal means.

10. In a machine for applying seals of the tubular shrink fit regenerated cellulose type to bottle tops and the like, a horizontal magazine adapted to contain a plurality of flat seals placed on edge, a rotary stripper drum disposed at the discharge end of said magazine, means to rotate said drum in a direction to present an upwardly movable cylindrical surface adjacent the flat surface of the seal at said discharge end of the magazine, means for moving said seals toward said stripper drum, a plurality of circumferentially spaced non-slip faces on said drum constituting stripper stations adapted to engage corresponding seals and aid in lifting the same one by one from said magazine, means to remove successive seals from stripper stations on said drum, and means to periodically interrupt the rotation of said drum to index successive stripper stations thereon relative to said magazine and said removal means.

11. In a machine for applying seals of the tubular shrink fit regenerated cellulose type to bottle tops and the like, a horizontal magazine adapted to contain a plurality of flat seals placed on edge, a rotary stripper drum disposed at the discharge end of said magazine, means to rotate said drum in a direction to present an upwardly movable cylindrical surface adjacent the flat surface of the seal at one end of the magazine, means for moving said seals toward said stripper drum, a plurality of circumferentially spaced non-slip faces on said drum constituting stripper stations adapted to engage corresponding seals and aid in lifting the same one by one from said magazine, each stripper station of said drum having a passage into the interior, means for applying a suction through said passage to the successive stations as they reach said magazine to hold the corresponding seal against said non-slip face and effect lifting of the seal with the drum, means to remove successive seals from stripper stations on said drum, means to release the suction on the seals as the corresponding stripper stations register with said removal means, and means to periodically interrupt the rotation of said drum to index successive stripper stations thereon relative to said magazine and said removal means.

12. In a machine for applying seals of the tubular shrink fit regenerated cellulose type to bottle tops and the like, a horizontal magazine adapted to contain a plurality of flat seals placed on edge, a rotary stripper drum disposed to present an upwardly movable cylindrical surface adjacent the flat surface of the seal at one end of the magazine, means for moving said seals toward said stripper drum, a plurality of circumferentially spaced non-slip faces on said drum constituting stripper stations adapted to engage corresponding seals and aid in lifting the same one by one from said magazine, each stripper station of said drum having a vacuum passage into the interior, means for applying a suction through said passage to the successive stations as they reach said magazine to hold the corresponding seal against said non-slip face and effect lifting of the seal with the drum, means to rotate said drum intermittently to present successive stripper stations thereon to said magazine, said drum carrying said seals successively to an opening station, and means to open each said seal while the same is on said drum.

13. In a machine for applying seals of the tubular shrink fit regenerated cellulose type to bottle tops and the like, a horizontal magazine adapted to contain a plurality of flat seals placed on edge, a rotary stripper drum disposed to present an upwardly moving cylindrical surface adjacent the flat surface of the seal at one end of the magazine, means for moving said seals toward said stripper drum, means for effecting the lifting of the seals successively by said drum as the latter rotates, and means to open each said seal while the same is on said drum.

14. In a machine for applying seals of the tubular shrink fit regenerated cellulose type to bottle tops and the like, a horizontal magazine adapted to contain a plurality of flat seals placed on edge, a rotary stripper drum disposed to present an upwardly moving cylindrical surface adjacent the flat surface of the seal at one end of the magazine, means for moving said seals toward said stripper drum, means for effecting the lifting of the seals successively by said drum as the latter rotates, means to open each said seal while the same is on said drum, and means to pick up said opened seals from the drum and effect transfer of the same to corresponding bottle tops.

15. In a machine for applying seals of the tubular shrink fit regenerated cellulose type to bottle tops and the like, a horizontal magazine adapted to contain a plurality of flat seals placed on edge, a rotary stripper drum disposed to present an upwardly moving cylindrical surface adjacent the flat surface of the seal at one end of the magazine, means for moving said seals toward said stripper drum, means for effecting the lifting of the seals successively by said drum as the latter rotates, and means adapted to press upon the outer surface of each successive seal on said drum with a non-slip surface of small area after the seal has been stripped from said magazine and to move laterally thereto a short distance in a direction toward a closed edge of the ends of the seal to effect opening of the seal near its two closed edges.

16. In a machine for applying seals of the tubular shrink fit regenerated cellulose type to bottle tops and the like, a horizontal magazine adapted to contain a plurality of flat seals placed on edge, a rotary stripper drum disposed to present an upwardly moving cylindrical surface adjacent the flat surface of the seal at one end of the magazine, means for moving said seals toward said stripper drum, means for effecting the lifting of the seals successively by said drum as the latter rotates, means adapted to press upon the outer surface of each successive seal on said drum with a non-slip surface of small area after the seal has been stripped from said magazine and to move laterally thereto a short distance in a direction toward a closed edge of the seal to effect opening of the ends of the seal near its two closed edges, and means to pick up said opened seals from the drum and effect transfer of the same to corresponding bottle tops.

17. A machine for applying seals of the tubular shrink fit regenerated cellulose type to bottle tops and the like, comprising a generally cylindrical stripping element, means to retain the seals in folded condition upon said cylindrical element, means to partially open said seals successively while the same are held by said cylindrical element, means to enter and pick up said partially opened seals one by one and transfer the same to a loading means, a loading means for receiving said seals from said transfer means and depositing the same successively upon corresponding bottle tops, and means on said loading means for completing the opening of said seals before they are applied to the bottle tops.

18. A machine for applying seals of the tubular shrink fit regenerated cellulose type to bottle tops and the like, comprising means to retain the seals in folded condition, a generally cylindrical element adapted to remove the folded seals successively from the end of a magazine, means to partially open said seals while on said cylindrical element, means to enter and pick up said partially opened seals and transfer the same to a loading means, a loading means for receiving said seals from said transfer means and depositing the same successively upon corresponding bottle tops, and means on said loading means for completing the opening of said seals before they are applied to the bottle tops.

19. A machine for applying seals of the tubular shrink fit regenerated cellulose type to bottle tops and the like, comprising a tank of seal preservative liquid, a receptacle in said tank adapted to contain a stack of individual folded flat seals submerged in said preservative liquid, means mounted for movement into and out of said tank and disposed at one end of said receptacle to lift the separate seals successively from said receptacle and tank, means to partially open said seals after removal thereof from said tank, means to pick up and transfer said partially opened seals one by one to a loading station, loading means at said loading station for receiving said seals from said transfer means and depositing the same successively upon corresponding bottle tops, means on said loading means for completing the opening of said seals before they are applied to the bottle tops, and a common drive for all of said means and coordinating the operation thereof to effect a rapid application of seals to a series of bottles.

20. In a machine of the class described, a loader head, a plurality of substantially parallel fingers arranged in pairs spaced apart in one plane to receive a partially open tubular seal thereon, slide members in said head for supporting said fingers, and means for moving said members apart to separate said fingers in a direction normal to said plane and thereby open said seal to substantially circular shape for application to a bottle top.

21. In a machine of the class described, a loader head, a plurality of substantially parallel fingers arranged in pairs spaced apart in one plane to receive a partially open tubular seal thereon, slide members in said head for supporting said fingers, means for moving said slide members apart to separate said fingers in a direction normal to said plane and thereby open said seal to substantially circular shape for application to a bottle top, a stripper plate carried by the head and having slots therein for receiving corresponding pairs of said fingers and providing for expansion and contraction of said fingers, and means for moving said stripper plate longitudinally of said fingers to strip the seal therefrom.

22. In a machine of the class described, a loader head, a plurality of substantially parallel fingers arranged in pairs spaced apart in one plane to receive a partially open tubular seal thereon, slide members in said head for supporting said fingers, means normally retaining said fingers in said planular arrangement, and means for moving said slide members apart to separate said fingers in a direction normal to said plane and thereby open said seal to substantially circular shape for application to a bottle top.

23. In a machine of the class described, a loader head, a plurality of substantially parallel fingers arranged in pairs spaced apart, in one plane to receive a partially open tubular seal thereon, slide members in said head for supporting said fingers, means for moving said slide members apart to separate said fingers in a direction normal to said plane and thereby open said seal to substantially circular shape for application to a bottle top, a stripper plate carried by the head and having slots therein for receiving corresponding pairs of said fingers and providing for expansion and contraction of said fingers, means normally retaining said stripper plate in retracted position upon said fingers, and means for moving said stripper plate longitudinally of said fingers to strip the seal therefrom.

24. In a machine of the class described, a loader head, a plurality of substantially parallel fingers arranged in pairs spaced apart in one plane to receive a partially open tubular seal thereon, slide members in said head for supporting said fingers, means for moving said slide members apart to separate said fingers in a direction normal to said plane and thereby open said seal to substantially circular shape for application to a bottle top, a stripper plate carried by the head and having slots therein for receiving corresponding pairs of said fingers and providing for expansion and contraction of said fingers, means for moving said stripper plate longitudinally of said fingers to strip the seal therefrom, means normally retaining said fingers in said planular arrangement, and means normally retaining said stripper plate in retracted position upon said fingers.

25. In a machine of the class described, a loader head, a plurality of substantially parallel fingers arranged in pairs spaced apart in one plane to receive a partially open tubular seal thereon, slide members in said head for supporting said fingers, means for moving said slide members apart to separate said fingers in a direction normal to said plane and thereby open said seal to substantially circular shape for application to a bottle top, a stripper plate carried by the head and having slots therein for receiving corresponding pairs of said fingers and providing for expansion and contraction of said fingers, means for moving said stripper plate longitudinally of said fingers to strip the seal therefrom, means normally retaining said fingers in said planular arrangement, means normally retaining said stripper plate in retracted position upon said fingers, and a common drive for said fingers and stripper plate operating the same in coordination.

26. In a machine of the class described, a tank adapted to contain preservative liquid for seals, a magazine in said tank adapted to contain a plurality of flat seals and to retain the same on edge beneath the level of the liquid, an end plate for said magazine generally of less height than the seals to confine the same against end thrust, means to move the seals toward said end plate, a shoe on the top of said seals disposed to prevent raising of the seals adjacent said end plate, a vertical conveyor member adapted to move upwardly adjacent said end plate and spaced from said shoe at least a distance corresponding to the thickness of a single seal, and a suction port in said conveyor member disposed to operate in conjunction with the liquid in said tank to force the upper edge portion of the end seal against the surface of said conveyor member and out from under said shoe whereby said end seal is stripped upwardly from said magazine as the conveyor member moves upwardly and while the adjacent seal in said magazine is held in place by said shoe, said conveyor member being adapted to strip separate seals from said magazine in rapid succession as the seals are moved toward said end plate.

27. In a machine of the class described, a tank adapted to contain preservative liquid for seals, a magazine in said tank adapted to contain a plurality of flat seals and to retain the same on edge beneath the level of the liquid, an end plate for said magazine generally of less height than the seals to confine the same against end thrust, means to move the seals toward said end plate, a shoe on the top of said seals disposed to prevent raising of the seals adjacent said end plate, an intermittently rotatable drum partially submerged below the level of the liquid and having an upwardly movable surface adjacent said end plate and spaced from said shoe to provide clearance for the passage of a seal therebetween, a plurality of stripper stations on said drum each having a series of small suction ports in the upper portion and disposed in a series extending transversely of the drum, the suction ports for each station being adapted to be successively positioned adjacent the exposed upper portion of the end seal and above said end plate of said magazine during a corresponding dwell in the rotation of said drum, means to apply suction through the ports of the stripper station adjacent the magazine to effect a lateral movement of the upper edge portion of the corresponding end seal toward and against the drum by the liquid pressure upon the seal, and means to maintain the suction on said seal as the drum rotates to lift the seal upwardly out of the liquid, whereby the end seal is stripped from the magazine while the adjacent seal is held against upward movement by said shoe and said drum strips separate seals from the magazine in rapid succession as the seals are moved toward said end plate.

28. In a machine of the class described, a tank adapted to contain preservative liquid for seals, a magazine in said tank adapted to contain a plurality of flat seals and to retain the same beneath the level of the liquid, a rotatable drum partially submerged below the level of the liquid and having its outer surface passing one end of said magazine, an end plate for said magazine adjacent the face of said drum and disposed to leave an edge portion of the end seal exposed to the drum in the direction of movement of the latter, means to move the seals in said magazine toward said end plate in stack formation with the side wall of the end seal bearing flat against said plate, a shoe disposed against the exposed edges of said seals to prevent removal thereof from the magazine by movement of the seals in the respective planes thereof, the edge of said shoe being spaced from the face of the drum to provide clearance for the passage of a single seal therebetween, a suction port in said drum disposed to operate in conjunction with the liquid in said tank to force the exposed edge portion of the end seal against the surface of the drum and free of said shoe, whereby the end seal is stripped from said magazine by the rotation of said drum while the adjacent seal is retained in said magazine by said shoe.

29. In a machine of the class described, a tank adapted to contain preservative liquid for seals, a magazine in said tank adapted to contain a plurality of flat seals beneath the level of the liquid, a rotatable drum partially submerged below the level of the liquid and disposed adjacent to one end of said magazine for stripping successive seals therefrom and lifting the same one by one out of the liquid, means to rotate said drum intermittently to present successive stripper stations on the drum surface to said magazine, at least one suction port in said drum surface at each stripper station, passages in said drum leading from said suction ports, a valve member within said drum having a pair of passages extending outwardly of the drum and having separate passage means for connecting said last named longitudinal passages to corresponding separate passages in said drum, means to reciprocate said valve member in correlation to the intermittent rotation of said drum, a high suction pump and a low suction pump both connected to discharge into said tank and having separate inlet conduits leading from the corresponding longitudinal passages of said valve member, the passage means in said valve member being disposed to connect the suction port for the stripper station at the stripping position adjacent the magazine to the high suction pump and to maintain the suction thereon as the drum rotates to a position where said suction port is above the level of the liquid in said tank and then to shift back to the next succeeding suction port disposed adjacent the magazine and upon said shifting to connect the suction port just previously raised from the liquid level to said low suction pump and to maintain said connection until the stripper station of said suction port reaches the station for removal of the seal therefrom.

30. In a machine for transferring and applying seals of the tubular shrink fit regenerated cellulose type to bottle tops and the like, the combination of a tank, a magazine of flat individual seals disposed inside said tank and having a discharge end with the seals therein disposed upright on edge, a liquid preservative for said seals within the tank and submerging the magazine of seals therein, means disposed in said tank at the discharge end of said magazine of seals to remove successive wet seals from the magazine and lift the same individually out of the liquid, and mechanism to transfer the individual seals separately while fresh and pliable from said lifting means to the point of application to successive bottle tops, whereby the seals are prevented from shrinking during transfer and prior to application thereof.

31. In a machine for transferring and applying seals of the tubular shrink fit regenerated cellulose type to bottle tops and the like, the combination of a tank, a magazine of flat individual seals disposed inside said tank and having a discharge end with the seals therein disposed upright on edge, a liquid preservative for said seals within the tank and submerging the magazine of seals therein, stripper mechanism dipping into said tank at one end of said magazine to lift seals successively from the discharge end of said magazine and liquid for transference to corresponding bottle tops, and means disposed to receive individual seals successively from said stripper mechanism and to open and transfer the same to the point of application.

32. In a machine for transferring and applying seals of the tubular shrink fit regenerated cellulose type to bottle tops and the like, the combination of a tank, a magazine of flat individual seals disposed inside said tank and having a discharge end with the seals therein disposed upright on edge, a liquid preservative for said seals within the tank and submerging the magazine of seals therein, means to strip wet seals one by one from the discharge end of said magazine and to lift the stripped seals from the liquid in said tank, and means disposed to receive successive seals from said stripper means and to open and transfer the same while fresh and pliable to corresponding bottle tops.

33. In a machine for applying seals of the tubular shrink fit regenerated cellulose type to bottle tops and the like, a tank containing preservative liquid for the seals, means in said tank for receiving a horizontal magazine of flat seals placed on edge in said magazine and submerged in said preservative liquid, means for stripping wet seals one by one from one end of said magazine, means to agitate and align the seals in said magazine and to move the same toward said stripping means, and means for opening and transferring said seals while fresh and pliable successively to corresponding bottle tops fed successively to the machine.

34. In a machine for applying seals of the tubular shrink fit regenerated cellulose type to bottle tops and the like, a tank containing preservative liquid for the seals, means in said tank for receiving a horizontal magazine of flat seals placed on edge in said magazine and submerged in said preservative liquid, means for stripping wet seals one by one from one end of said magazine, means pressing the seals at the other end of said magazine to move the same toward said stripping means, and means for opening and transferring said seals while fresh and pliable successively to corresponding bottle tops fed successively to the machine.

35. In a machine for applying seals of the tubular shrink fit regenerated cellulose type to bottle tops and the like, a tank for containing preservative liquid for the seals, means in said tank for receiving a horizontal magazine of flat seals placed on edge in said magazine, means for stripping wet seals one by one from one end of said magazine, means pressing the seals at the other end of said magazine to move the same toward said stripping means, means to periodically move one wall of said magazine receiving means to align the seals therein as they are fed forwardly to the stripping means, and means for opening and transferring said seals while fresh and pliable successively to corresponding bottle tops fed successively to the machine.

JACK LEE POMEROY.
WILLIAM BARTON EDDISON.

REFERENCES CITED

The following references are of record in the file of this patent:

UNITED STATES PATENTS

| Number | Name | Date |
|---|---|---|
| 322,670 | Yates | July 21, 1885 |
| 1,125,802 | Bracy | Jan. 19, 1915 |
| 1,339,370 | Roehrig | May 4, 1920 |
| 1,743,734 | Steele | Jan. 14, 1930 |
| 1,835,336 | Risser | Dec. 8, 1931 |
| 2,049,022 | Reininger | July 28, 1936 |
| 2,079,326 | Levy et al. | May 4, 1937 |
| 2,103,302 | Strout | Dec. 28, 1937 |
| 2,178,429 | Lowry | Oct. 31, 1939 |
| 2,272,258 | Allen | Feb. 10, 1942 |
| 2,273,689 | Boron et al. | Feb. 17, 1942 |
| 2,409,626 | Harrington et al. | Oct. 22, 1946 |
| 2,579,458 | Allen et al. | Dec. 25, 1951 |

FOREIGN PATENTS

| Number | Country | Date |
|---|---|---|
| 282,510 | Great Britain | Dec. 29, 1927 |